(12) United States Patent
Biggs

(10) Patent No.: US 9,986,838 B1
(45) Date of Patent: Jun. 5, 2018

(54) HEAD SUPPORT APPARATUS

(71) Applicant: Joseph R. Biggs, Arroyo Grande, CA (US)

(72) Inventor: Joseph R. Biggs, Arroyo Grande, CA (US)

( * ) Notice: Subject to any disclaimer, the term of this patent is extended or adjusted under 35 U.S.C. 154(b) by 0 days. days.

(21) Appl. No.: 15/691,719

(22) Filed: Aug. 30, 2017

Related U.S. Application Data

(63) Continuation of application No. 15/399,752, filed on Jan. 6, 2017, now Pat. No. 9,770,110.

(51) Int. Cl.
*A47C 7/38* (2006.01)
*F16B 7/14* (2006.01)

(52) U.S. Cl.
CPC ............ *A47C 7/383* (2013.01); *F16B 7/1418* (2013.01)

(58) Field of Classification Search
USPC ............................ 248/118, 354.1, 354.3, 357
See application file for complete search history.

(56) References Cited

U.S. PATENT DOCUMENTS

| | | |
|---|---|---|
| 245,639 A | 8/1881 | Lay |
| 1,260,929 A | 3/1918 | Maxcy |
| 2,667,913 A | 2/1954 | Dustin |
| 3,161,435 A | 12/1964 | Halverson |
| 3,380,694 A | 4/1968 | Branner |
| 3,929,309 A | 12/1975 | De Vore |
| 4,389,740 A | 6/1983 | Henry |
| 4,565,409 A | 1/1986 | Hollonbeck |
| 5,303,890 A | 4/1994 | Carruth |
| 5,501,646 A | 3/1996 | Miller |
| 5,560,573 A | 10/1996 | Colver |
| 6,270,160 B1 | 8/2001 | Blake |
| 6,427,273 B1 | 8/2002 | Berke |
| 7,044,267 B2 | 5/2006 | Sigler |
| 7,140,086 B2 | 11/2006 | Heaton |
| 7,748,064 B2 | 7/2010 | Hamilton |
| 8,042,775 B1 | 10/2011 | Gallegos |
| 8,052,110 B2 | 11/2011 | Wang |
| 8,117,787 B2 | 2/2012 | Lee |
| 8,814,106 B2 | 8/2014 | Aguilera |
| 8,826,581 B2 | 9/2014 | Boll |
| 8,905,207 B2 | 12/2014 | Hamilton |
| 2002/0050009 A1 | 5/2002 | Ley |
| 2006/0237617 A1 | 10/2006 | Dwello |
| 2008/0240868 A1 | 10/2008 | Bolton |
| 2011/0169316 A1 | 7/2011 | Goei |
| 2016/0081482 A1 | 3/2016 | Schumacher |

(Continued)

FOREIGN PATENT DOCUMENTS

WO     2013120207     8/2013

OTHER PUBLICATIONS

Biggs; U.S. Appl. No. 15/399,752, filed Jan. 6, 2017.

(Continued)

*Primary Examiner* — Bradley Duckworth
(74) *Attorney, Agent, or Firm* — Fitch, Even, Tabin & Flannery LLP

(57) ABSTRACT

A head support apparatus for supporting a head of a person. The head support apparatus includes a tube and a rod configured to slidably and lockably couple to the tube. A cup and pad are coupled to an upper end of the rod. In use, a lower end of the tube bears on a support. A person's chin is rested on the pad whereby the weight of the person's head is supported by the head support apparatus.

19 Claims, 5 Drawing Sheets

(56) References Cited

U.S. PATENT DOCUMENTS

2016/0113407 A1   4/2016  Sampson

OTHER PUBLICATIONS

IVUN; Simple Solutions; Ventilator-Assisted Living; vol. 27, No. 4, Aug. 2013; www.ventusers.org.
USPTO; Non-final office action issued in U.S. Appl. No. 15/399,752 dated Mar. 8, 2017.
USPTO; Notice of Allowance issued in U.S. Appl. No. 15/399,752 dated Jun. 1, 2017.
PCT; International Search Report and Written Opinion for PCT/US18/12418 mailed from the International Searching Authority dated Feb. 12, 2018.

HEAD SUPPORT APPARATUS

This application is a continuation of U.S. application Ser. No. 15/399,752, filed Jan. 6, 2017, for HEAD SUPPORT APPARATUS, which is incorporated in its entirety herein by reference.

BACKGROUND OF THE INVENTION

1. Field of the Invention

The present invention relates generally to a support for a body part of a resting person, and more specifically to a head support.

2. Discussion of the Related Art

While in a sitting position for an extended period of time, a person may become tired and benefit from a type of body support. Various types of body support devices are known in the art. Body support devices typically include a base portion which rests on a floor, a seat, or other surface such as a desk, and a support portion which supports a portion of the upper body. The upper body portion may one or more of a head, a chin, a neck, arms, and/or other upper body portion. The support portion may be contoured and/or padded to more comfortably receive the body portion.

SUMMARY OF THE INVENTION

Several embodiments of the invention advantageously address the needs above as well as other needs by providing a head support apparatus for supporting a head of a person comprising: a tube having a tube upper end and a tube lower end configured to bear on a support; a rod with a rod lower end and a rod upper end, the rod lower end configured to slidably fit within the tube upper end; a cup rigidly coupled to the rod upper end and facing upwards; a disk-shaped pad wherein a perimeter of the pad is coupled to a rim of the cup; and a locking device for locking and releasing the rod with respect to the tube, wherein a length of the apparatus is adjusted and the head support apparatus in the locked position is configured to support the head of the person when the head support apparatus is bearing on the support.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
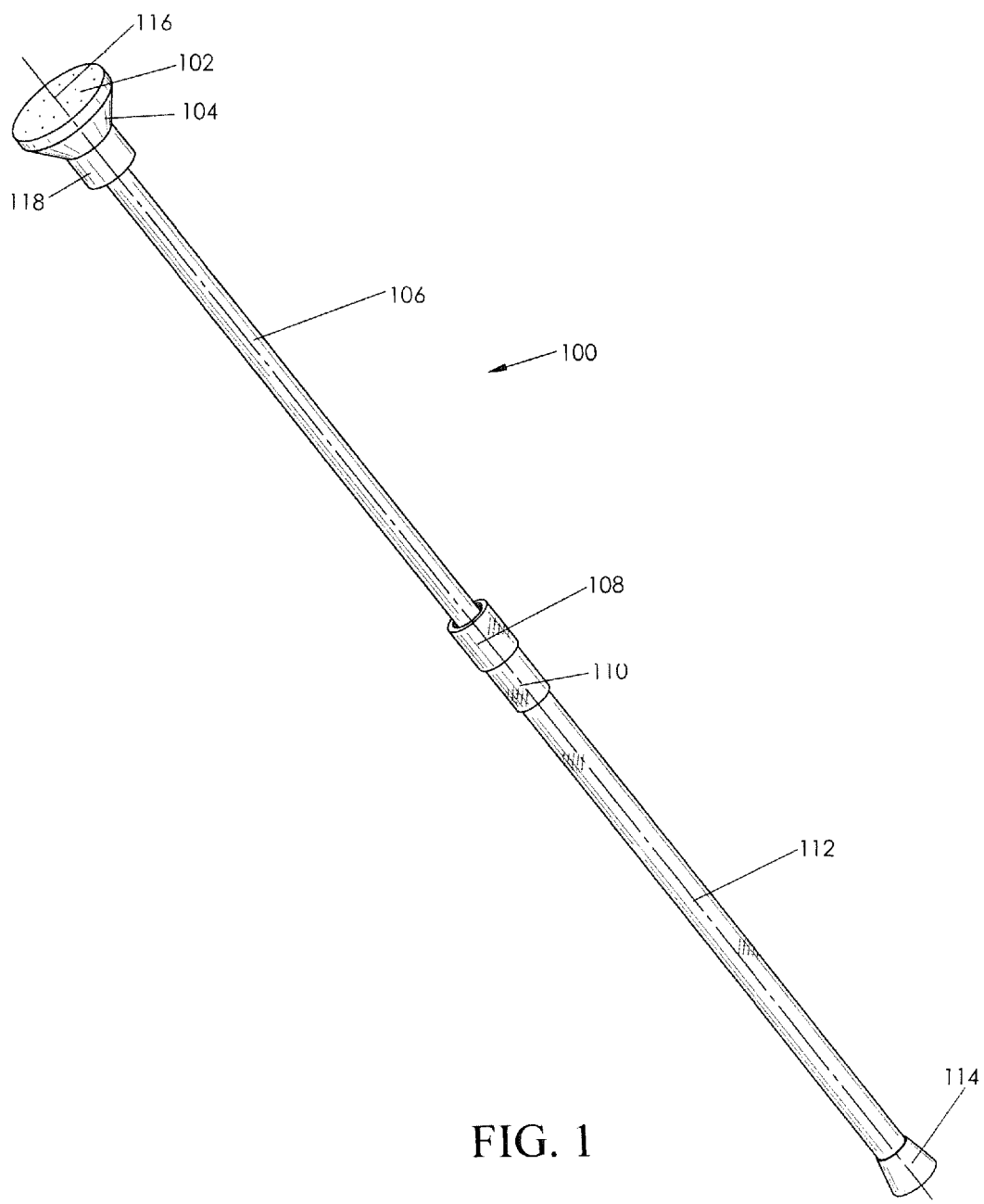
FIG. 1 is a perspective view of a head support apparatus in a first embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 2:
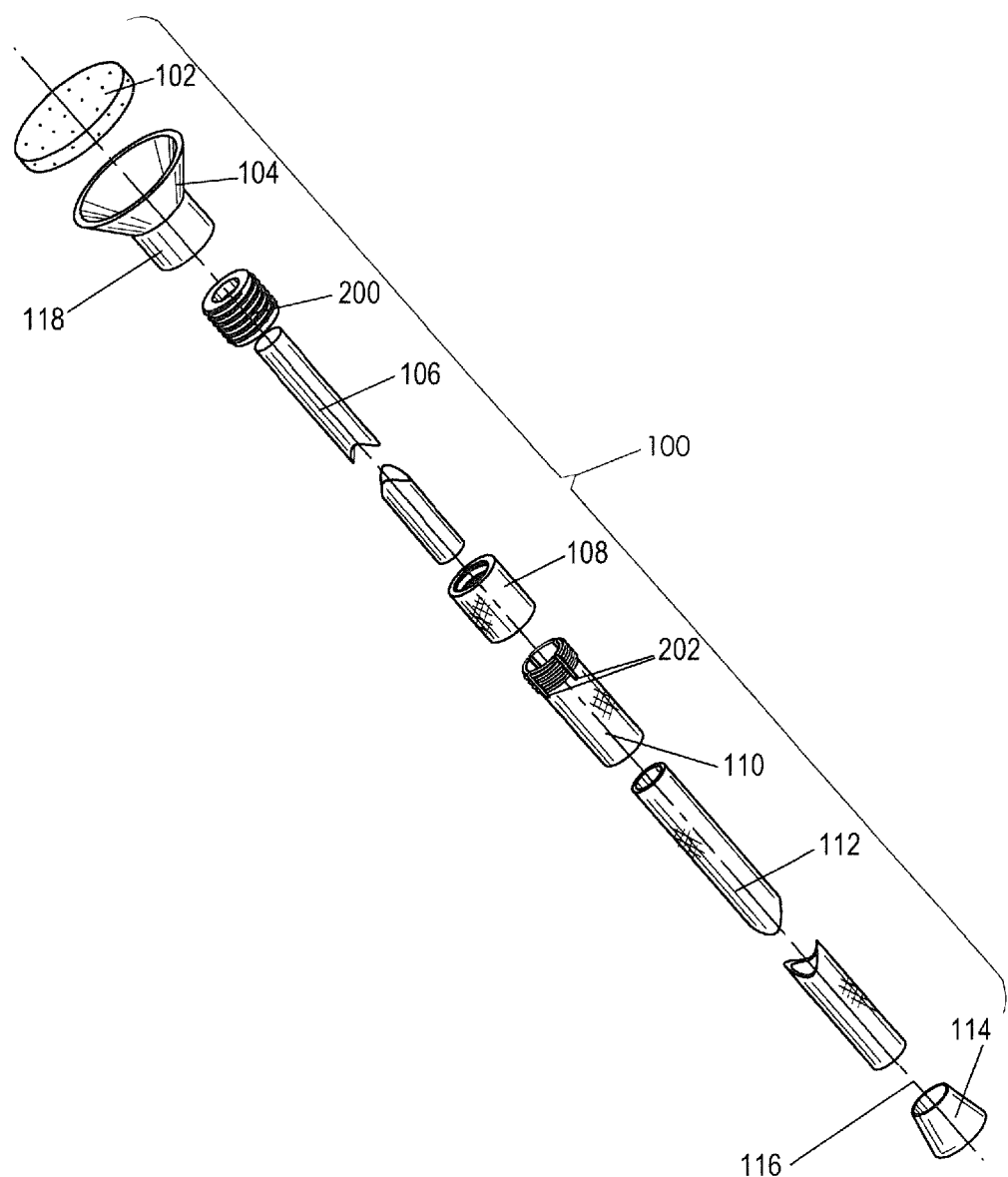
FIG. 2 is an exploded perspective view of the head support apparatus.
Figure 3:
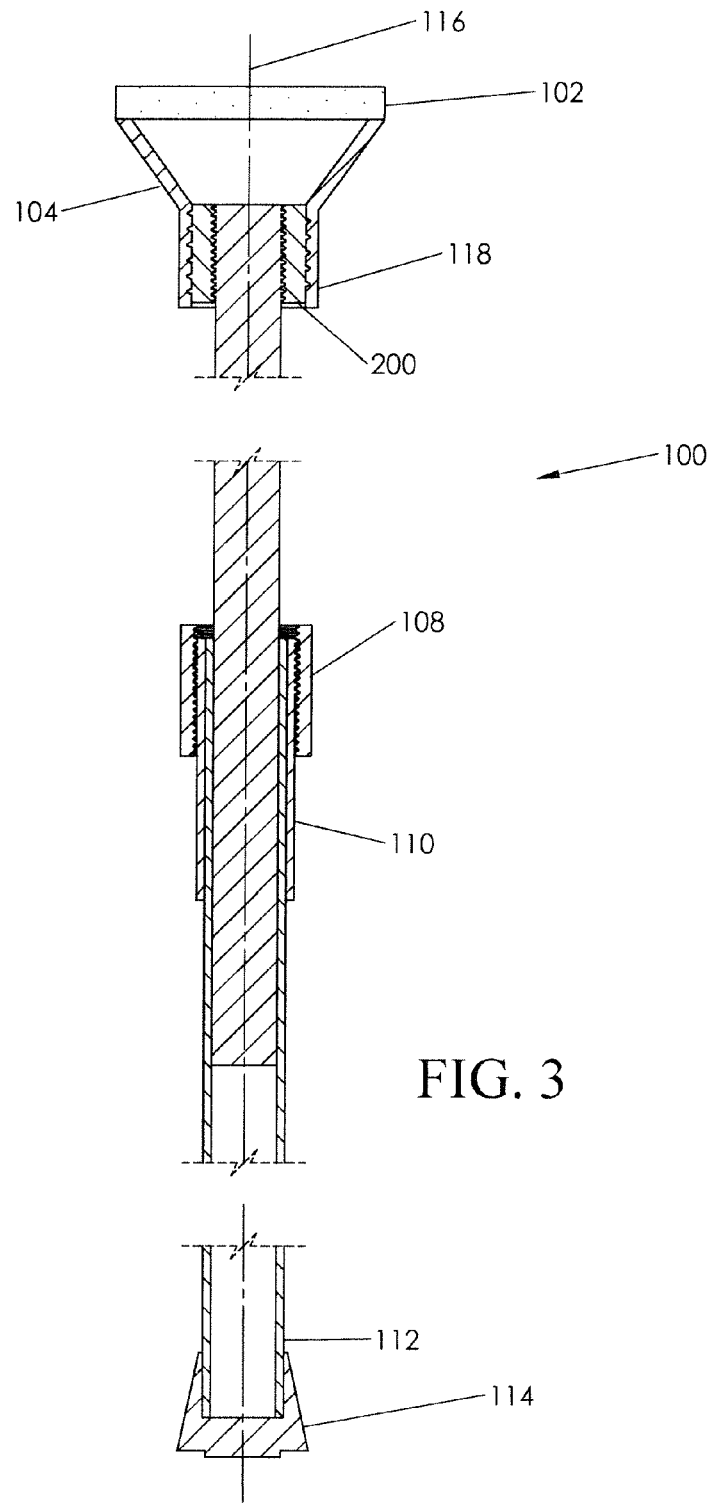
FIG. 3 is a sectional view of the head support apparatus.

Referring first to FIGS. 1, 2 and 3, a perspective view, an exploded view, and a sectional view, respectively, of a head support apparatus 100 in a first embodiment of the present invention are shown. Shown are a pad 102, a cup 104, a rod 106, a collar 108, a tube coupler 110, a tube 112, a tip 114, a longitudinal axis 116, and a bushing 200.

The head support apparatus 100 comprises the cup 104 coupled to an upper end of the cylindrical rod 106. A lower portion of the rod 106 is adjustably coupled to the tube 112 by a lower portion of the rod 106 slidably fit within an upper end of the tube 112, providing for adjustment of a length of the head support apparatus 100 by sliding the rod 106 within the tube 112. A diameter of the rod 106 and an inner diameter of the tube 112 are configured to permit the rod 106 to slide freely within the tube 112 when the rod 106 is unlocked with respect to the tube 112, and simultaneously configured to allow for locking the rod 106 in place with respect to the tube 112 when a locking device (such as the collar 108 of the present embodiment) is operated.

In the present embodiment, the tubular collar 108 is a locking compression device operable to compress the tube 112 around the portion of the rod 106 located within the tube 112, preventing movement of the rod 106 within the tube 112 and thus locking the length of the head support apparatus 100. The collar 108 is removable from the tube 112 to permit repeated adjustment. At least a portion of an exterior surface of the collar 108 is knurled or otherwise textured to aid in gripping of the collar 108. The collar 108 comprises polyvinyl chloride (PVC), CPVC (Chlorinated polyvinyl chloride), another suitable plastic, or any other material suitable for performing the locking function as described herein. In the embodiment shown in FIGS. 1-3, the collar 108 is approximate 2 inches long and has an inner collar diameter of approximately ⅝ inches. The collar length is configured to include enough threads to lock the rod 106 in place longitudinally when the collar 108 is threaded onto the tube 112 (via the tube coupler 110). In the present embodiment the externally threaded tubular tube coupler 110 is rigidly coupled to the upper end of the tube 112 such that the upper end of the tube 112 is fit within the tube coupler 110. The coupling of the tube coupler 110 to the tube 112 may be glue or other adhesive, or other suitably strong method of coupling. The collar 108 is then removably coupled to the tube 112 by threading/tightening the collar 108 onto the external threads of the tube coupler 110. The tube coupler 110 is of sufficient length to fit enough external threads to couple the collar 108 to the tube coupler 110. In the present embodiment, the outer tube coupler threads (or outer tube 112 threads in some embodiments) and the inner collar threads are tapered such that compression of the tube 112 is increased as the collar 108 is threaded more onto the tube 112 (in FIG. 1, via the tube coupler 110). In the present embodiment, the length of the tube coupler 110 is configured to ensure that flexing of the tube coupler 110 and the tube 112 during the locking and/or unlocking operation does not loosen the glue coupling between the tube coupler 110 and the tube 112.

The rod 106 may be made of any suitably strong material that can be configured to couple to the tube 112 as described, such as PVC, polyethylene, polypropylene, melamine, polytetrafluoroethylene, polyoxymethylene, fiberglass, nylon rod, aluminum, or steel. In one embodiment a rod length is approximately 16 inches, and a tube length is approximately 14 inches. This provides for the overall head support apparatus 100 length to be adjustable from about 16 inches to about 28 inches. The tube 112 may be made of any suitably strong material that is flexible enough to allow for the compression of the rod 106. In the present embodiment using the compression locking device of the collar 108, the tube material is such that in operation by a person the hand tightening of the coupler 110 or other compression device is able to compress the tube 112 sufficiently around the rod 106 to prevent movement of the rod 106 during use by a person. In the present embodiment, the upper end of the tube coupler 110 (or the tube 112 if the tube 112 is directly coupled to the collar 108) includes a plurality of longitudinal slots 202 as shown in FIG. 2. In the embodiment shown, four longitudinal slots 202 are included, and are evenly spaced around the tube perimeter. The longitudinal slots 202 allow the tube 112 to be compressed enough to lock the rod 106 in place using general hand strength, for cases where the tube 112 is stiff enough that hand strength alone would not be sufficient to compress the tube 112 enough to lock the rod 106 in place. At least a portion of an exterior surface of the tube 112 is knurled or otherwise textured to aid in gripping of the head support apparatus 100.

The gripping tip 114 is coupled to a lower end of the tube 112 and in some embodiments is a crutch tip or walking cane tip as commonly known in the art. The tip 114 is configured to functionally grip a support surface such as a seat of a chair.

The cup 104 is generally circular bowl-shaped with straight sides, although a more conventional bowl-shape with convex sides may be used or any other generally open shape that is suitable for attaching the pad 102. In some embodiments the cup 104 shape may be contoured to fit a specific facial contour. A base of the cup 104 is coupled to the upper end of the rod 106 with the open portion of the cup 104 facing upward. The disk-shaped pad 102 is coupled to a rim of the cup 104 such that the pad 102 covers the open portion and is the pad 102 is coupled and supported by the rim. In some embodiments, the cup 104 may be a solid frustoconical or hemispherical shape, and the pad 102 coupled to an upper flat surface of the cup 104. In other embodiment the pad 102 instead of a circular disk-shape may have a square or other geometrical shape in plan, with the perimeter shape of the cup 104 modified to provide support to the pad 102.

In the embodiment shown in FIGS. 1-3, the tubular stem 118 extends downward from the base of the cup 104 and includes a bore with internal threads. The stem 118 is rigidly and threadably coupled to the upper end of the rod 106, the upper end of the rod 106 being externally threaded and screwed into the bore. Other alternative methods of coupling the cup 104 to the rod 106 may be used, such as gluing. In some embodiments multiple methods of joining may be used, such as a glued threaded connection. In the present embodiment, the intermediate tubular bushing 200 including both inner and outer threads is used to provide adjustment between a bore diameter of the stem 118 and the outer diameter of the rod 106. The bushing 200 is sized to be threadably inserted in the bore of the stem 118, and also threadably receive the rod 106, whereby the cup 104 is rigidly coupled to the rod 106.

The cup 104 comprises polypropylene or other suitably rigid plastic such as PVC. In the present embodiment a typical diameter of the cup 104 (and also the diameter of the pad 102) at the open end is approximately 2 inches. A range of diameters of the cup 104 open end and the pad 102 is approximately 1.5-4 inches. The pad 102 comprises closed-cell foam, although other suitable material may be used. In the present embodiment, the pad 102 includes a slight downward curvature. The thickness and the material of the pad 102 are configured to provide a comfortable, slightly yielding fit to a chin of a person when the chin is supported by the head support apparatus 100. In the present embodiment, the thickness of the pad 102 is approximately ½ inch. In some embodiments, an upward exterior surface of the pad 102 may be concave to provide a more comfortable fit to the chin.

Referring again to FIGS. 1-3, the head support apparatus 100 is shown in a locked position, with the locking compression device of the collar 108 threaded onto the tube 112 via the tube coupler 110 such that the tube 112 is compressed around the rod 106 and the position of the rod 106 is locked in place under the force applied by the person during use.

To adjust the overall length of the apparatus 100, the collar 108 is partially unscrewed (i.e. loosened) from the tube 112 until the rod 106 is enabled to slide freely within the tube. Generally, the collar 108 will not need to be removed from the tube 112 in order to adjust the rod 106. The rod 106 is then moved to a new position with respect to the tube 112 and the collar 108 is re-screwed to the tube 112 until the rod position is again locked in place.

The cup 104 is removably coupled to the rod 106 with threads to allow for removal of the cup 104 to make the head support apparatus 100 more compact for travel or storage.

In the present embodiment, thread seal tape is applied to the external threads of the tube 112 (located on the tube coupler 110 in the present embodiment) in order to provide lubrication. Other embodiments may not require thread seal tape.

Figure 4:
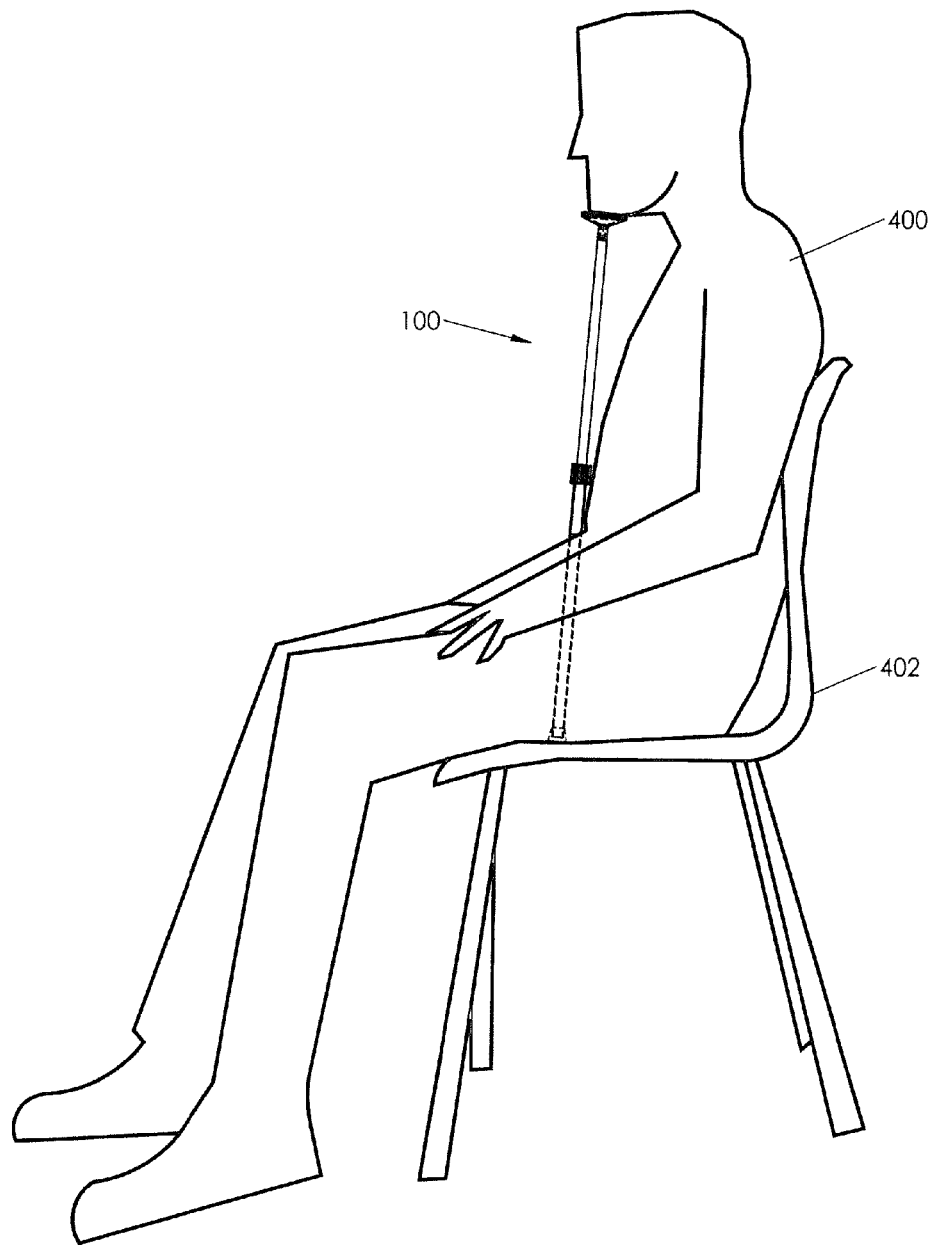
FIG. 4 is a perspective view of a person using the head support apparatus.

Referring next to FIG. 4, a perspective view of an exemplary person 400 during use of the head support apparatus 100 in one embodiment of the present invention is shown. Shown are the head support apparatus 100, the exemplary person 400, and a chair 402.

As shown in FIG. 4, the person 400 is shown seated in the chair 402. The head support apparatus 100 is in a generally upright orientation, with the lower end of the head support apparatus 100 bearing on and supported by the seat of the chair 402. The person 400 is supporting his head on the head support apparatus 100 by resting his chin on an upper end of the head support apparatus 100, whereby body weight is transferred to the chair 402 through the head support apparatus 100. It will be understood by those of ordinary skill in the art that while the chair 402 is shown in the exemplary illustration, the support may be any type including a generally horizontal surface, such as an armrest, a counter, a table, etc. Additionally, the person 400 may be in a standing or other position.

In the present embodiment, the cup 104 and pad 102 are designed to comfortably support the chin of the person 400. The pad 102 provides a soft and comfortably conforming surface while the cup 104 provides underlying support and transfers the load to the rod 106 below and ultimately to the chair 402 or other support.

The head support apparatus 100 is advantageous when a person is sitting or in another generally static position for a lengthy period of time, for example at a movie theater, during a church service, or during an airplane flight. Support of the head and neck vertebrae, and the muscles is located at the back of the neck. The major portion of the head and neck, and thereby the weight, is cantilevered over the chest. A support directly under the chin, such as the head support apparatus 100, takes a large strain off the neck vertebrae and muscles. The head support apparatus 100 thereby relieves strain on neck and/or back muscles by allowing the person 400 to rest his head on the head support apparatus 100. While the head support apparatus 100 is primarily configured to support the chin, it will be understood that use of the head support apparatus 100 to support other parts of the body (e.g. a cheek or jawbone of the person 400) may be desirable.

Figure 5:
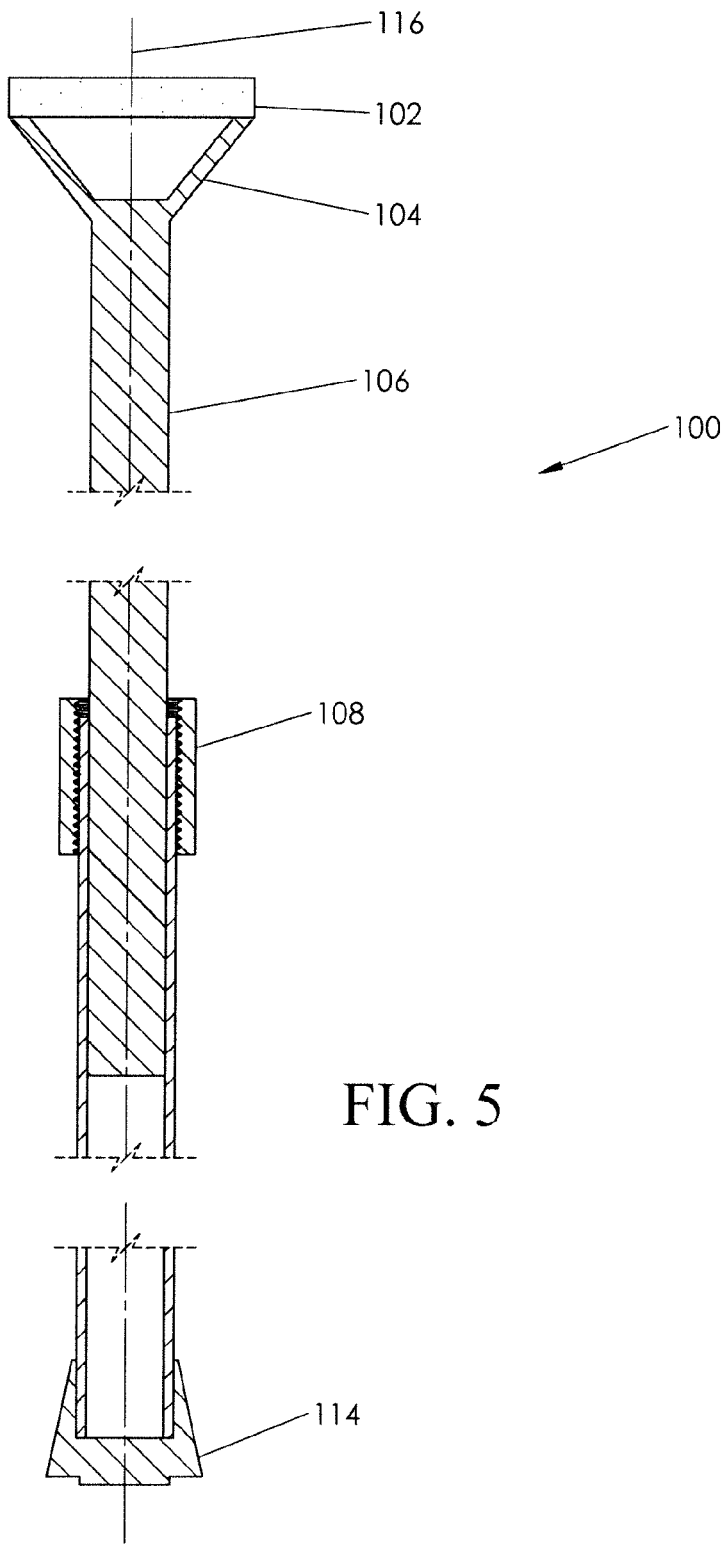
FIG. 5 is a sectional view of the head support apparatus in a second embodiment of the present invention.

Referring next to FIG. 5, a sectional view of the head support apparatus 100 is shown in a second embodiment of the present invention. Shown are the pad 102, the cup 104, the rod 106, the collar 108, the tube 112, and the tip 114.

In the second embodiment shown in FIG. 5, the cup 104 has been formed integrally with the rod 106. Additionally, in lieu of the tube coupler 110 previously shown, the tube 112 in this embodiment includes external threads on the outer perimeter of the upper end of the tube 112, configured to receive the locking collar 108 as previously described. Although the embodiment shown in FIG. 5 includes modification to both the rod 106/cup 104 and the tube 112, it will be understood that other embodiments may include modification of either the rod 106/cup 104 or the tube 112. The function of the head support apparatus 100 in the embodiment of FIG. 5 is the same as the embodiment shown in FIGS. 1-3.

While the invention herein disclosed has been described by means of specific embodiments, examples and applications thereof, numerous modifications and variations could be made thereto by those skilled in the art without departing from the scope of the invention set forth in the claims. Other changes, substitutions or modifications, for example for economics of production volume and relative cost trade-offs, would not change the intended use and purpose of the head support apparatus 100.

What is claimed is:

1. A method of using a head support apparatus for supporting a head of a person seated on a generally horizontal seating surface above the ground, wherein the head support apparatus comprises a tube having a tube upper end and a tube lower end configured to bear on the generally horizontal seating surface, a rod with a rod lower end and a rod upper end, the rod lower end configured to slidably fit within the tube upper end, a cup rigidly coupled to the rod upper end and facing upwards, a disk-shaped pad wherein a perimeter of the pad is coupled to a rim of the cup, and a locking device for locking and releasing the rod with respect to the tube, comprising the steps of:

sitting by a user in a generally upright position;

positioning of the head support apparatus in a generally upright orientation with the tube lower end bearing on a horizontal surface;

while the locking device is released, sliding the rod lower end within the tube upper end to adjust a vertical position of the pad such that the pad is in position to support a head of the user while the user is seated in the generally upright position;

locking the rod with respect to the tube using the locking device; and resting of a chin of the user on the pad while the user is maintained in the generally upright sitting position, whereby body weight of the user is transferred directly from the chin to the horizontal surface through the head support apparatus.

2. The method of using the head support apparatus of claim 1, the tube lower end further comprising a gripping tip.

3. The method of using the head support apparatus of claim 1 wherein the pad comprises foam.

4. The method of using the head support apparatus of claim 3 wherein the foam is closed-cell foam.

5. The method of using the head support apparatus of claim 1, wherein an upward exterior surface of the pad is concave.

6. The method of using the head support apparatus of claim 1, wherein at least a portion of an exterior surface of the tube is textured.

7. The method of using the head support apparatus of claim 1 wherein the locking device is a compression device.

8. The method of using the head support apparatus of claim 7 wherein an outer surface of the tube upper end includes threads and the compression device is a tubular collar including internal threads, wherein tightening the tubular collar onto the tube locks the rod with respect to the tube.

9. The method of using the head support apparatus of claim 7 wherein the tube upper end includes an externally threaded tubular coupler coupled to the tube upper end by fitting the tube upper end within the coupler and wherein the compression device is a tubular collar including internal threads, wherein tightening the tubular collar onto the tube locks the rod with respect to the tube.

10. The method of using the head support apparatus of claim 1, wherein a lower end of the cup includes a bore.

11. The method of using the head support apparatus of claim 10, wherein the bore is internally threaded and the rod upper end is externally threaded, whereby the rod is coupled to the cup by threading the rod into the cup.

12. The method of using the head support apparatus of claim 1, wherein the rod and cup are integrally formed.

13. The method of using the head support apparatus of claim 1, wherein the tube and cup comprise plastic.

14. The method of using the head support apparatus of claim 1, wherein the apparatus length is adjustable between 16 inches and 28 inches.

15. The method of using the head support apparatus of claim 1, wherein a diameter of the pad is between 2 and 4 inches in diameter.

16. The method of using the head support apparatus of claim 1, wherein the rod comprises plastic.

17. The method of using the head support apparatus of claim 2, wherein the gripping tip is one of a tip configured for use with a crutch and a tip configured for use with a walking cane.

18. The method of using the head support apparatus of claim 1, wherein the horizontal surface is located above the ground.

19. The method of using the head support apparatus of claim 1, wherein the user is sitting on a chair and the horizontal surface is a seat of the chair.

* * * * *